US012638822B2

(12) United States Patent
Koda

(10) Patent No.: US 12,638,822 B2
(45) Date of Patent: May 26, 2026

(54) DISPLAY CONTROL SYSTEM

(71) Applicant: DMG MORI CO., LTD., Nara (JP)

(72) Inventor: Yorihito Koda, Nara (JP)

(73) Assignee: DMG MORI CO., LTD., Nara (JP)

( * ) Notice: Subject to any disclaimer, the term of this patent is extended or adjusted under 35 U.S.C. 154(b) by 403 days.

(21) Appl. No.: 17/794,244

(22) PCT Filed: Feb. 1, 2021

(86) PCT No.: PCT/JP2021/003471
§ 371 (c)(1),
(2) Date: Jul. 20, 2022

(87) PCT Pub. No.: WO2021/161831
PCT Pub. Date: Aug. 19, 2021

(65) Prior Publication Data
US 2023/0072717 A1    Mar. 9, 2023

(30) Foreign Application Priority Data

Feb. 14, 2020    (JP) ................................. 2020-023606

(51) Int. Cl.
*G05B 19/409* (2006.01)
*G05B 19/4093* (2006.01)

(52) U.S. Cl.
CPC ..... *G05B 19/409* (2013.01); *G05B 19/40938* (2013.01); *G05B 2219/50291* (2013.01); *G05B 2219/50334* (2013.01)

(58) Field of Classification Search
None
See application file for complete search history.

(56) References Cited

U.S. PATENT DOCUMENTS

| | | | |
|---|---|---|---|
| 2010/0023156 A1* | 1/2010 | Trepina ................ | G05B 19/406 |
| | | | 700/177 |
| 2013/0222580 A1* | 8/2013 | Kurahashi .......... | G01B 11/2433 |
| | | | 348/135 |
| 2016/0091889 A1 | 3/2016 | Nakajima et al. | |

(Continued)

FOREIGN PATENT DOCUMENTS

| | | |
|---|---|---|
| CN | 105658375 A | 6/2016 |
| CN | 107077124 A | 8/2017 |

(Continued)

*Primary Examiner* — David Earl Ogg
(74) *Attorney, Agent, or Firm* — IP Business Solutions, LLC

(57) ABSTRACT

A display control system for displaying and controlling a screen, including: a first display instruction means that instructs the screen to display a first mode of the first machine tool; a second display instruction means that instructs the screen to display a second mode of the second machine tool; a third display instruction means that instructs the screen to display an image captured by the camera; and a control means that displays and controls, in response to receiving input of tool related information regarding a tool in the first mode, an image regarding the tool related information, which is obtained from the camera. The tool related information includes any one of a tool number, a pot number of a magazine accommodating the tool, a station number of a turret to which the tool is attached, and a tool correction value.

3 Claims, 10 Drawing Sheets

80

(56)     References Cited

U.S. PATENT DOCUMENTS

| | | | |
|---|---|---|---|
| 2016/0236308 A1 | 8/2016 | Suzuyama et al. | |
| 2016/0334777 A1 | 11/2016 | Sato | |
| 2017/0308055 A1 * | 10/2017 | Hoshino | .............. G05B 19/409 |
| 2018/0169816 A1 * | 6/2018 | Hori | ...................... G06F 3/0488 |
| 2019/0286093 A1 | 9/2019 | Taira | |

FOREIGN PATENT DOCUMENTS

| | | | | |
|---|---|---|---|---|
| EP | 3348350 A1 * | 7/2018 | .......... | B23Q 1/0045 |
| JP | H04317101 A | 11/1992 | | |
| JP | H0740171 A * | 2/1995 | | |
| JP | 2016071407 A | 5/2016 | | |
| JP | 2019159808 A | 9/2019 | | |
| WO | 2015056319 A1 | 4/2015 | | |
| WO | 2015056339 A1 | 4/2015 | | |
| WO | WO-2018220776 A1 * | 12/2018 | ............. | B23Q 17/09 |

* cited by examiner

FIRST AXIS

SECOND AXIS

DISPLAY CONTROL SYSTEM

TECHNICAL FIELD

The present disclosure relates to techniques for assisting operations performed on multiple machine tools.

BACKGROUND ART

In recent years, a machining system is widely available which is formed of multiple machine tools. Use of multiple machine tools allows a user to streamline machining of workpieces.

As one example of the machining system, Japanese Patent Laying-Open No. 2016-71407 (PTL 1) discloses a numerical control system in which numerical controls machines are separated into a cloud and a machine tool. More specifically, the numerical control system causes CNC control, PMC control, and display controlling software to operate in the cloud, and causes servo control, for causing the machine to operate, and spindle controlling software to operate in the machine tool. The CNC control, the PMC control, and the display controlling software are managed in the cloud, thereby allowing the numerical control system to have reduced maintenance cost for the respective machine tools.

As another example of the machining systems, WO2015/056339 (PTL 2) discloses a processing machine line whose objective is to confirm predetermined information of one machine tool on multiple screens at once. More specifically, according to the processing machine line, for example, a first machine tool (one machine tool equipped with a display), among multiple machine tools, displays predetermined information of the first machine tool on the display of the first machine tool, while a second machine tool, different from the first machine tool (a machine tool other than the first machine tool), displays the predetermined information of the first machine tool on the display of the second machine tool. Consequently, during manipulation of the first machine tool, the operator is allowed to confirm at once from the respective displays the predetermined information of the first machine tool, for example, a ladder diagram regarding the first machine tool and an I/O monitor that are displayed on both the display of the first machine tool and the display of the second machine tool.

CITATION LIST

Patent Literature

[PTL 1] Japanese Patent Laying-Open No. 2016-71407
[PTL 2] WO2015/056339

SUMMARY OF INVENTION

Technical Problem

In recent years, machining systems are further sophisticated, and, for example, handing over a workpiece between machine tools by an automatic transfer vehicle equipped with a robot, is considered. Accordingly, it is needed, even from safety aspect, to cause the machine tools and the automatic transfer vehicle to operate as much unattended as possible near the machine tools and in the area where the automatic transfer vehicle can move.

However, PTL 1 aggregates some of the functionalities of the machine tools in the cloud, and the operator is required to be present in front of the control panel of each machine tool to carry out setups, manual machining, etc. PTL 2 discloses sharing the conditions of a machine tool on a screen of other machine tool, but the operator is still required to be present in front of each machine tool to carry out setups, manual machining, etc.

Solution to Problem

Thus, the present invention is made to provide the invention recited in the attached claims.

Advantageous Effects of Invention

According to the present invention, a user can manipulate a machine tool even while he/she is not present in front of the machine tool.

DESCRIPTION OF EMBODIMENTS

Hereinafter, an embodiment according to the present invention is described, with reference to the accompanying drawings. In the following description, like reference signs refer to like parts and like components. Their names and functionalities are also the same. Accordingly, detailed description thereof will not be repeated. Note that the embodiment and variations thereof described below may be selectively combined as appropriate.

<A. Device Components of Machining System 10>

Figure 1:
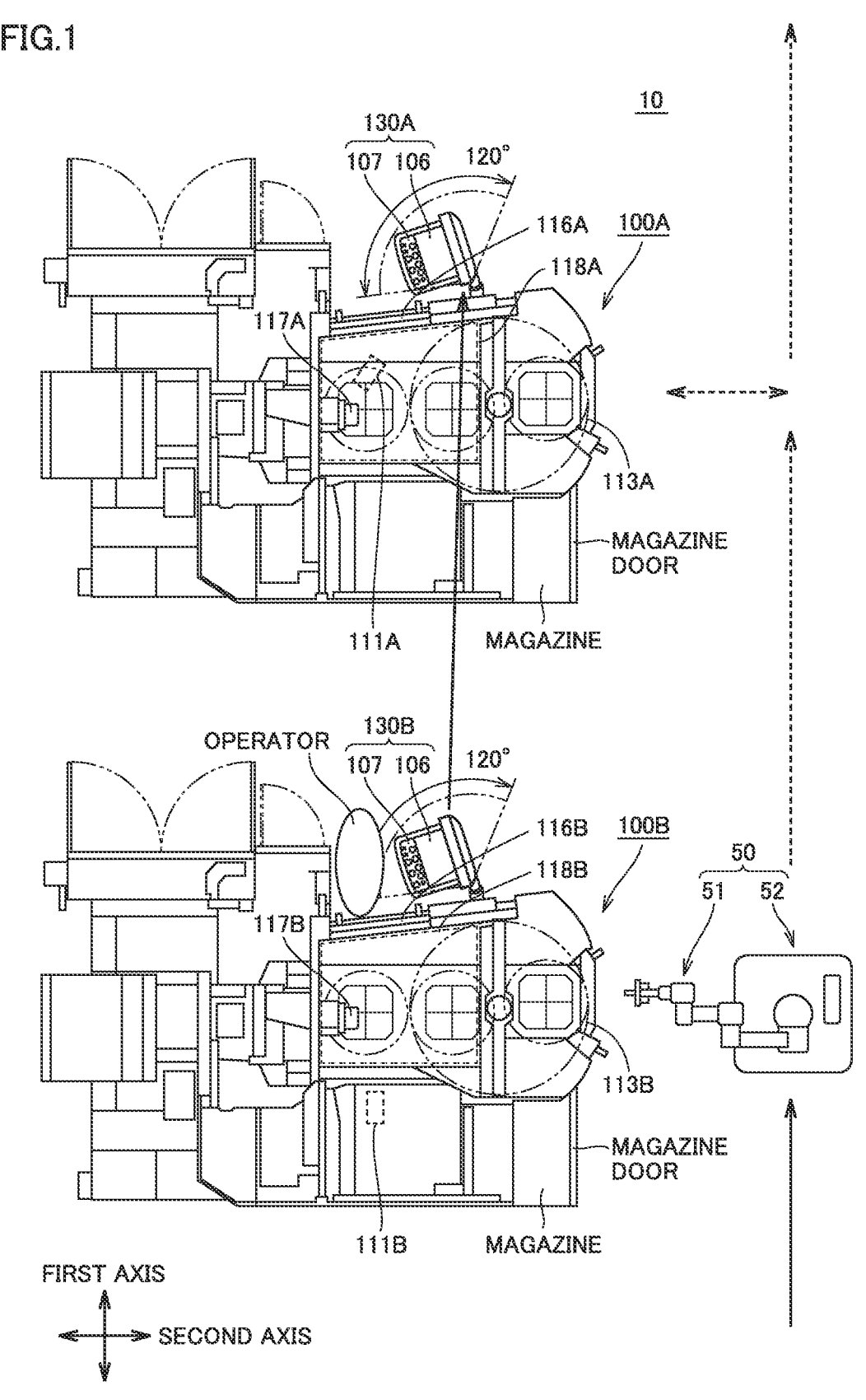
FIG. 1 is a top view of a machining system.

Referring to FIG. 1, one example of a machining system 10 according to an embodiment will be described. FIG. 1 is a top view of the machining system 10.

The machining system 10 includes: a first machine tool 100A; a second machine tool 100B which includes a display control system; and a transfer device 50.

The first machine tool 100A and the second machine tool 100B may be of the same type, or different types. The first machine tool 100A and the second machine tool 100B are capable of communications with each other via the display control system. The first machine tool 100A and the second machine tool 100B may be wirelessly connected or wired. As one example, a constant periodic communication standard, such as EtherCAT (registered trademark), EtherNet/IP (registered trademark), CompoNet (registered trademark), or a non-constant periodic communication standard, such as EtherNET (registered trademark), may be employed as the communication standard for the first machine tool 100A and the second machine tool 100B.

In the following, where no distinction is made between the first machine tool 100A and the second machine tool 100B, any one of the first machine tool 100A and the second machine tool 100B will also be referred to as a machine tool 100.

The machine tool 100 is a workpiece processing machine. As one example, the machine tool 100 performs subtractive manufacturing (SM process) on a workpiece. Alternatively, the machine tool 100 may perform additive manufacturing (AM process) on a workpiece. The machine tool 100 may be a vertical or horizontal machining center or turning center. Alternatively, the machine tool 100 may be a lathe, an additive processing machine, or other cutting machine or grinding machine, or, furthermore, a complex processing machine thereof. The machine tool 100 may also include a magazine accommodating multiple tools. The first machine tool 100A and the second machine tool 100B according to the present embodiment are horizontal machining centers, and each include a magazine that can accommodate sixty tools. The magazine has pots each for accommodating one tool, and the pots are numbered. The present embodiment will be described with reference to a magazine having sixty pots that can accommodate sixty tools. The first machine tool 100A and the second machine tool 100B include a first camera 111A and a second camera 111B. The first machine tool 100A has the first camera 111A at a location from which the first camera 111A can capture an image of a tool attached to the main spindle. The second machine tool 100B has the second camera 111B at a location from which the second camera 111B can capture an image of a tool accommodated in the magazine. While the present embodiment is described with reference to a horizontal machining center, if the machine tool is a lathe or a turning center, etc., a camera may be provided at a location from which the camera can capture an image of a tool attached to a tool post station. FIG. 1 shows an operator standing in front of the control panel of the second machine tool 100B and operating the second machine tool 100B. However, an opening and closing door 116B is provided between the operator and a machining area 118B, and the operator can open the opening and closing door 116B and exchange the tool attached to the main spindle 117B to another. The first machine tool 100A also has a similar opening and closing door 116A. The operator can thus open the opening and closing door 116A and attach a tool to a main spindle 117A or clean chippings in a machining area 118A.

The transfer device 50 transfers a workpiece. FIG. 1 shows a transfer device which includes an arm robot 51 mounted on an automatic transfer vehicle 52. The arm robot 51-equipped automatic transfer vehicle enables unattended transfer of a pallet attached to a workpiece. A specific way of transfer of a workpiece is as follows. A pallet, having attached thereto a workpiece machined by the second machine tool 100B, is moved to a pallet transfer port of the second machine tool 100B. As the pallet is moved to the front of the pallet transfer port, the opening and closing door 113B for opening or closing the pallet transfer port of the second machine tool 100B opens. As the opening and closing door 113B opens, an arm of the arm robot 51 enters the second machine tool 100B and grasps the pallet. The arm robot 51 grasping the pallet rotates about the rotational spindle and folds the arm so as to be in a stable posture while grasping the pallet. The automatic transfer vehicle 52, having attached thereto the arm robot that is gasping the pallet, moves to the front of the pallet transfer port of the first machine tool 100A, and waits for the opening and closing door 113A of the first machine tool 100A to open. As the opening and closing door 113A opens and the pallet transfer port opens, the arm robot 51, attached to the transfer device 50, extends the arm and places the pallet on the pallet receptacle of the first machine tool 100A. The first machine tool 100A detects that a new pallet is placed on the pallet receptacle, and moves the pallet into the machining area 118A. As the pallet is attached to a predetermined location within the machining area 118A, the workpiece is machined in accordance with a predesigned machining program. The pallet, having thereon the workpiece whose machining has been completed by the first machine tool 100A, may be transferred to the next machine tool by the transfer device 50 with the arm robot 51, as with the second machine tool 100B. If all machining operations end, the workpiece may be detached from the pallet and stored in a stocker.

While the transfer device has been described with reference to the automatic transfer vehicle 52 with the arm robot 51, the present disclosure is not limited thereto. For example, the transfer device may be a loader, which is driven along the rail by a drive mechanism such as a servomotor.

The first machine tool 100A includes a first control panel 130A. The first control panel 130A includes a first display unit having a first screen. The machine tool 100B includes a second control panel 130B. The second control panel 130B includes a second display unit having a second screen. In the following, where no distinction is made between the first control panel 130A and the second control panel 130B, any one of the first control panel 130A and the second control panel 130B will also be referred to as a control panel 130. Where no distinction is made between the first screen and the second screen, any one of the first screen and the second screen will also be referred to as a screen.

The control panel 130 includes a display 106 and operation keys 107. The display 106 displays various information regarding machining on a screen. The display 106 is, for example, a liquid crystal display, an organic electro luminescence (EL) display, or other display device. The display 106, which is one example of the present embodiment, is configured of a touch panel, and receives various operations on the machine tool 100 through touch operations. Of course, the display 106 may not be a touch panel. The operation keys 107 are configured of hardware keys, and receive various operations on the machine tool 100. The operation keys 107 may include a handle, a machine operation board, a keyboard, or an emergency stop button, etc. In contrast, a machine operation board and a keyboard can be displayed on the screen by software, as a software machine operation board and a software keyboard, etc. The display 106 and the operation keys 107 are designed as appropriate, depending on the size of the control panel, for example.

While the machining system 10 has been described above as being configured of two machine tools, which are the first machine tool 100A and the second machine tool 100B, it should be noted that the machining system 10 may be configured of three or more machine tools.

While the machining system 10 has been described above as a line processing machine, the machining system 10 is not necessarily be a line processing machine. As one example, the machining system 10 may be configured of the first machine tool 100A and the second machine tool 100B that are installed at different locations. In this case, the machining system 10 does not necessarily include the transfer device 50.

<B. Tool Correction Value Setting Process>

The operator measures a machined workpiece W with an instrument to confirm whether the workpiece W is machined to intended precision. If the workpiece W is not machined to intended precision, the operator reviews settings of the tool correction value for the machine tool. At this time, the machine tool 100 according to the present embodiment receives settings of the tool correction value for other machine tool 100. This obviates the need for the operator to move to the front of each machine tool.

Figure 2:
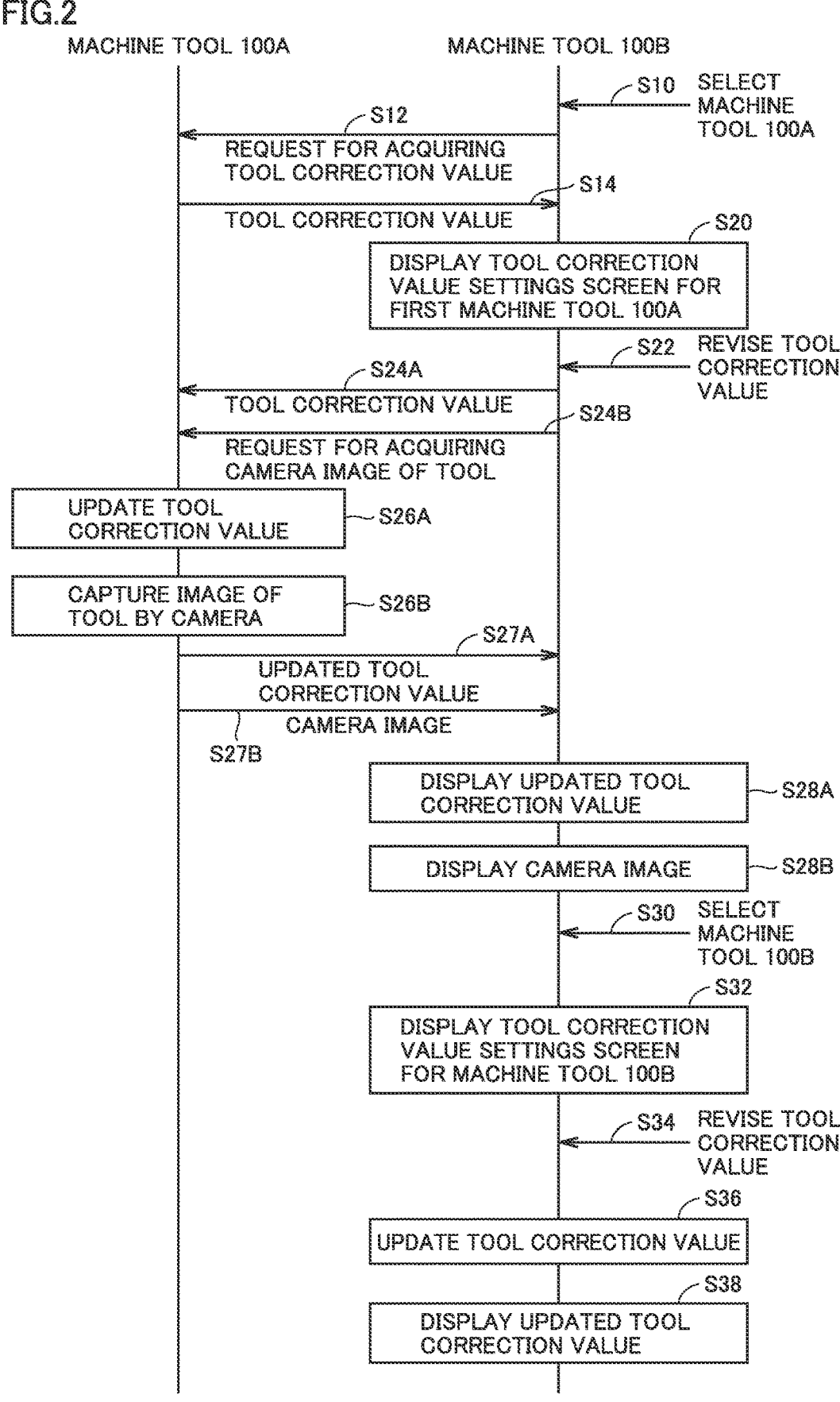
FIG. 2 is a flowchart showing a flow of operating a first machine tool remotely from a second machine tool (a display control system).

In the following, a tool correction value setting process according to the embodiment will be described, with reference to FIG. 2. FIG. 2 is a flowchart showing a flow of setting the tool correction value for the first machine tool 100A remotely from the second machine tool 100B.

In step S10, the second machine tool 100B receives an operation of selecting a machine tool a tool correction value for which is to be set. As one example, suppose that a button "1" is selected in MACHINE SELECTION on the screen displayed on the control panel display of the second machine tool 100B of FIG. 3, and the first machine tool 100A is thereby selected in step S10.

In step S12, the second machine tool 100B transmits to the first machine tool 100A a request for acquiring a tool correction value for a tool attached to the first machine tool 100A.

In step S14, in response to receiving from the second machine tool 100B the request for acquiring a tool correction value, the first machine tool 100A transmits to the machine tool 100B the current tool correction value set to the first machine tool 100A.

Figure 3:
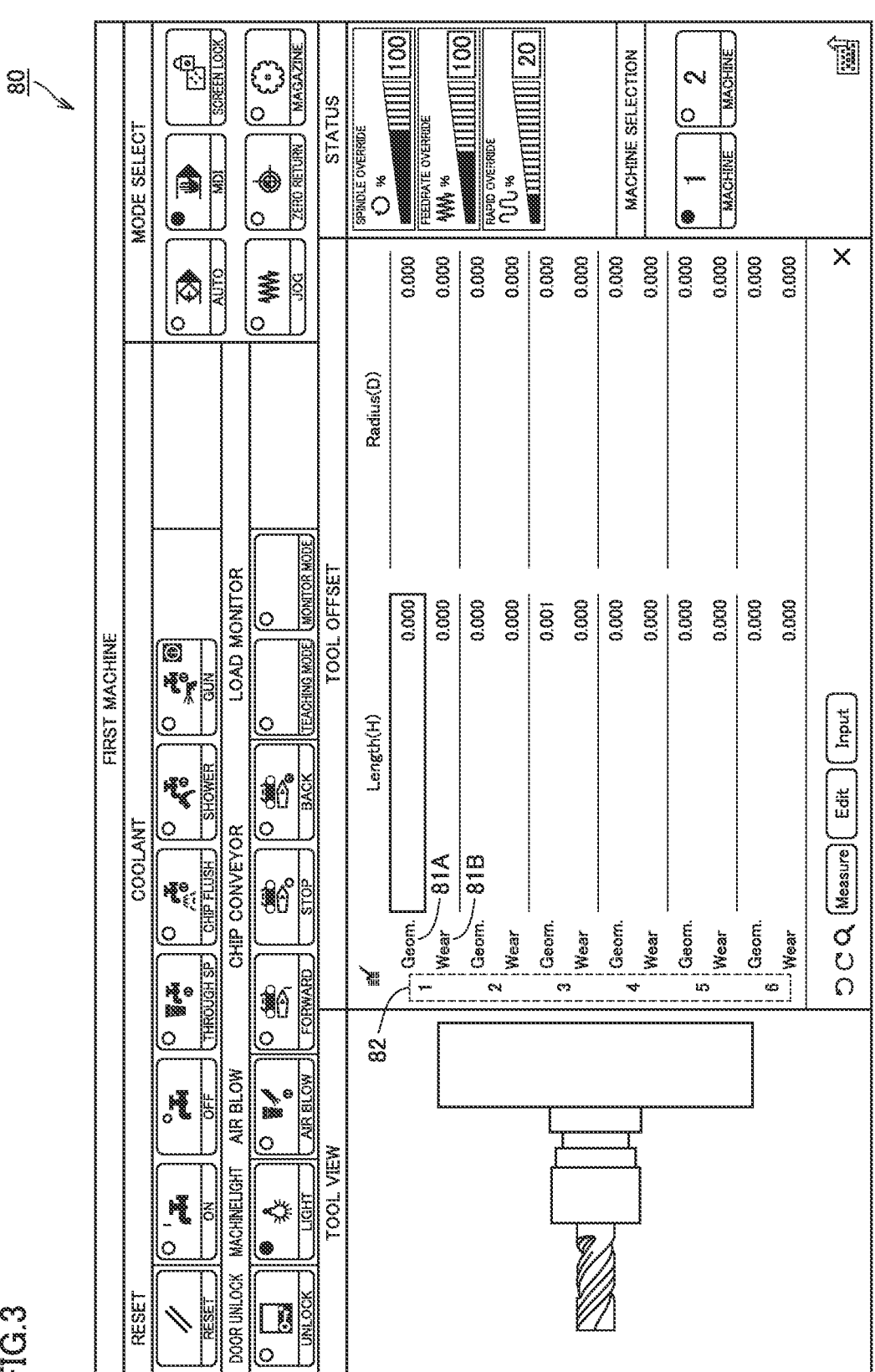
FIG. 3 is a diagram illustrating one example screen controlled by the display control system.

In step S20, based on the tool correction value received from the first machine tool 100A, the display control system of the second machine tool 100B configures a tool correction value settings screen, and displays the settings screen in a window screen TOOL OFFSET within a screen for displaying the information of the first machine tool 100A of FIG. 3. The settings screen receives a revision to the tool correction value according to the first machine tool 100A. The settings screen displayed on the second machine tool 100B may be the same or different from the tool correction value settings screen displayed on the first machine tool 100A. FIG. 3 shows a screen shown on the display of the control panel of the second machine tool 100B, displaying information regarding the first machine tool 100A, indicating that the screen is partially constituted by the screen TOOL OFFSET, which is a settings screen for a tool correction value for a tool attached to the first machine tool 100A.

The settings screen 80 receives a tool correction value setting operation. In the example of FIG. 3, as one example of the tool correction value, a geometric parameter 81A indicating the geometry of a tool is shown as "Geom." and a wear parameter 81B indicating the amount of wear of the tool is shown as "Wear." In addition, a still image or video of the tool attached to the tool spindle of the first machine tool 100A, captured by a camera mounted on the first machine tool 100A, is displayed in a TOOL VIEW screen next to the TOOL OFFSET screen which is a settings screen. An image of the tool captured by the camera may be displayed as is in the TOOL VIEW screen. However, the wear conditions may be highlighted in red, for example. Moreover, the initial geometry of the tool may be displayed in a dashed line, overlaying the image of the tool captured by the camera. Depending on the way of use by the operator, how the TOOL VIEW screen is displayed can be changed as appropriate. However, such display needs to show the state of the tool attached to the machine tool in a manner that the operator is not required to be present in front of the machine tool to operate the machine tool.

The geometric parameter 81A displayed in the "Geom." field specifies a geometry of the tool. Setting the geometric parameter 81A allows the machine tool 100 to machine the workpiece, while understanding the geometry of the tool. Typically, the geometric parameter 81A is an offset value relative to a predetermined reference point. The geometric parameter 81A includes, for example, the width of a tool in X direction from a predetermined reference point, the width of a tool in Z direction from a predetermined reference point, the width of the tool in Y direction from a predetermined reference point, and the diameter of a tool from a predetermined reference point.

The wear parameter 81B displayed in the "Wear" field specifies an amount of wear of the tool. Setting the wear parameter 81B allows the machine tool 100 to machine the workpiece, while understanding the amount of wear of the tool. Typically, the wear parameter 81B is an offset value relative to a predetermined reference point. The wear parameter 81B includes, for example, the wear width of a tool in X direction from a predetermined reference point, the wear width of a tool in Z direction from a predetermined reference point, the wear width of a tool in Y direction from a predetermined reference point, and the amount of wear of a tool radially from a predetermined reference point.

Each parameter set of the geometric parameter 81A and the wear parameter 81B is associated with a tool number 82. The tool number 82 is referred to in the machining program. In other words, if a tool number is specified in the machining program, the machine tool 100 refers to the parameter set (the geometric parameter 81A and the wear parameter 81B) associated with the tool number.

While the wear parameter 81B is changeable, the geometric parameter 81A is not. In other words, the operator can remotely change the wear parameter 81B, and cannot remotely change the geometric parameter 81A, because the geometry of the tool hardly changes. Therefore, there is a low chance of changing the geometric parameter 81A once it is set. Remote operation is not permitted with respect to the geometric parameter 81A that has such a low chance of being changed, thereby preventing incorrect operation in changing the settings.

Upon completion of the revision operation on the tool correction value, the operator finalizes the revision on the settings screen 80. In response to this, in step S24A, the display control system of the second machine tool 100B transmits to the first machine tool 100A the tool correction value set in step S22. At this time, the display control system also transmits to the first machine tool 100A a request for acquiring a camera image, captured by the camera, of the tool number of the tool whose tool correction value has been revised (step S24B). Here, information identifying the tool needs to be transmitted together with the acquisition request. In the present embodiment, a cell storing the revised tool correction value is detected, a tool number of a corresponding tool is detected from the detected cell, and the tool number information is transmitted to the first machine tool 100A. However, the present disclosure is not limited thereto. Information of a number assigned to the cell storing the revised tool correction value may be transmitted to the first machine tool 100A as tool related information regarding the tool. Besides the tool correction value, the tool related information includes the tool number, the pot number of a magazine accommodating the tool, and the station number of a turret having the tool attached thereto. For example, if a simple tool exchange program is created, and executed at the machine tool to attach the tool to the main spindle, such a tool exchange program is the tool related information. The tool exchange program requires the tool number of the tool to be attached to the main spindle, and therefore contains, what is called, tool number information.

In step S26A, based on the tool correction value received from the display control system of the second machine tool 100B, the first machine tool 100A updates the current tool correction value at the first machine tool 100A. This rewrites the tool correction value settings at the first machine tool 100A remotely from the second machine tool 100B.

In step S26B, the first machine tool 100A calls a tool having the updated tool correction value from the magazine, and attaches the tool to the tool spindle by the automated tool exchange system. Subsequently, an image of the tool is captured by the camera mounted on the first machine tool 100A. A still image or video of the tool may be captured.

In step S27A, in response to the tool correction value being successfully updated, the first machine tool 100A transmits the updated tool correction value to the second machine tool 100B.

In step S27B, the still image or video of the tool captured by the camera is transmitted to the second machine tool 100B. At this time, the initial state (the state as purchased) of the captured tool may also be transmitted to the second machine tool 100B.

In step S28A, in response to receiving the updated tool correction value from the first machine tool 100A, the second machine tool 100B displays the updated tool correction value. This allows the operator to recognize that the tool correction value has been successfully updated.

In step S28B, in response to receiving the still image or video of the tool from the first machine tool 100A, the second machine tool 100B displays the image in TOOL VIEW. This allows the operator to recognize which tool the tool correction value has been revised for, and also conditions of the tool such as wear. The operator is further allowed to confirm whether tool registration information of the tool, the tool correction value for which has been revised, is correct. For example, while tool information is registered at the first machine tool 100A in which a tool number "1" is associated with an endmill having a diameter of 1 cm, the operator can confirm, by reviewing TOOL VIEW, that the tool called to the main spindle by the tool number "1" is an endmill having a diameter of 2 cm.

Figure 6:
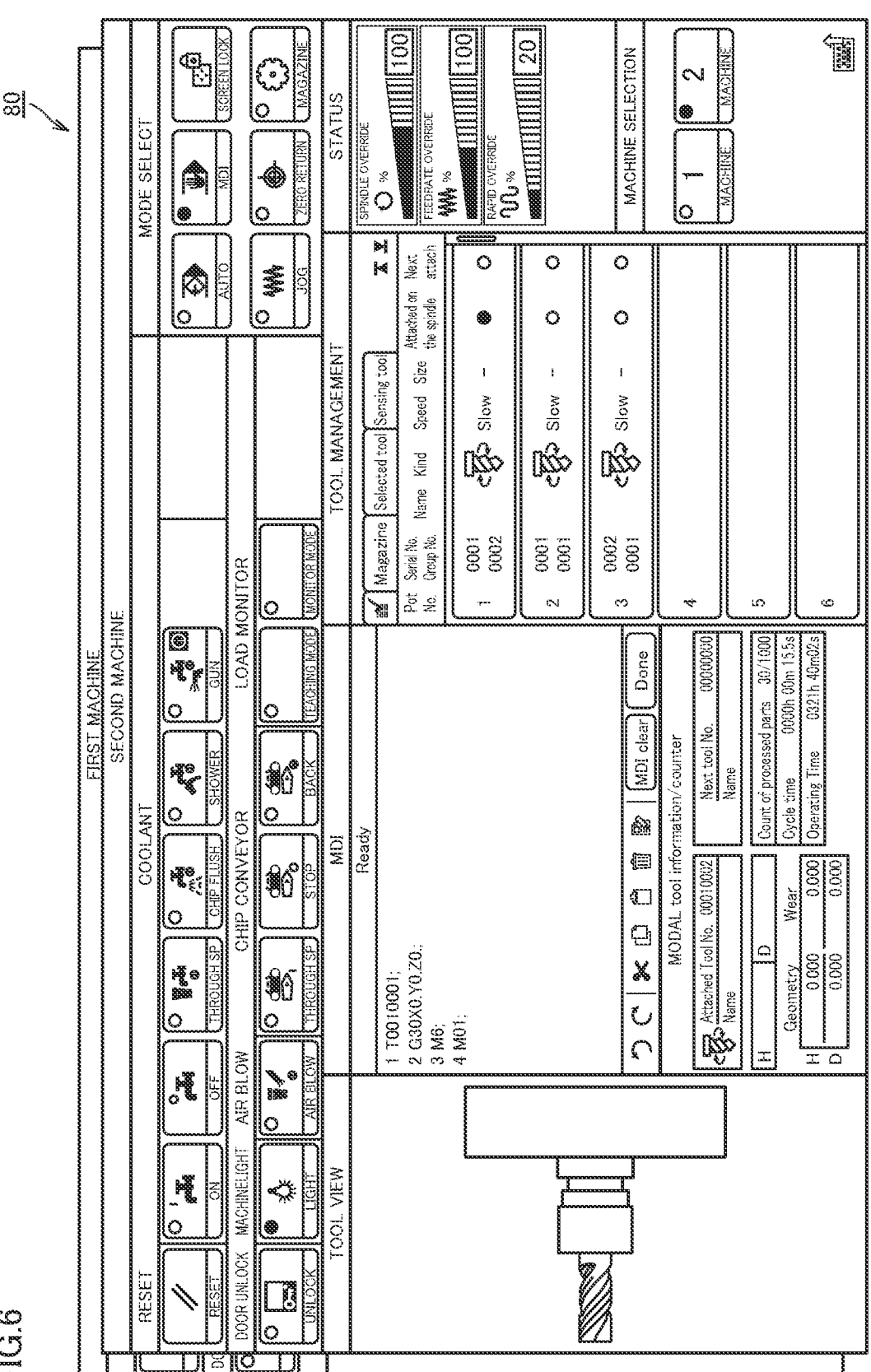
FIG. 6 is a diagram illustrating one example screen controlled by the display control system.

In step S30, the second machine tool 100B receives an operation of selecting a machine tool a tool correction value for which is to be set. As one example, suppose that the second machine tool 100B is selected in step S30. In that case, a SECOND MACHINE screen as shown in FIG. 6 is displayed, which is a screen displaying information of the second machine tool 100B.

In step S32, the second machine tool 100B obtains the tool correction value that is currently set to the second machine tool 100B, and displays a settings screen for the tool correction value on the display 106 of the second control panel 130B of the second machine tool 100B. The settings screen displayed on the display 106 of the second control panel 130B is the TOOL OFFSET screen of FIG. 6.

In step S34, the second machine tool 100B receives a revision operation on the tool correction value on the settings screen displayed on the display 106 of the second control panel 130B. The revision operation may be implemented by a touch operation on the display 106 of the second control panel 130B or an operation of the operation keys 107 on the second control panel 130B.

Upon completion of the revision operation on the tool correction value, the operator finalizes the revision to the tool correction value on the settings screen. In response to this, in step S36, the second machine tool 100B updates the current tool correction value known to the second machine tool 100B.

In step S38, in response to the tool correction value being successfully updated, the second machine tool 100B displays the updated tool correction value. This allows the operator to recognize that the tool correction value has been successfully updated. Note that since the operator is manipulating the control panel of the second machine tool 100B, he/she can call to the tool spindle the tool having the updated tool correction value, and directly, visually confirm the state of the tool. Thus, an image of the tool may not be captured by the camera. Of course, an image of the tool may be captured by the camera, subjected to image processing, such as coloring the wear state in red, and displayed in TOOL VIEW.

As described above, using the display control system allows the operator to set tool correction values of multiple machine tools by operating one machine tool. Therefore, there is no need for the operator to move to the front of each machine tool to set a tool correction value. The greater the number of machine tools managed, the more prominent the effects of reducing such a movement effort are.

If many tool correction values are to be revised, the operator may need to make memos on pieces of paper and carry them with he/she. However, the operator can set tool correction values of all machine tools by operating just one machine tool, obviating the need for the operator to carry such memos.

If a workpiece is transferred by a robot, a fence is installed around the machine tool. In this case, the operator is not allowed to come closer to the machine tool in motion. The operator can set tool correction value of such a machine tool remotely by operating other machine tool, obviating the need for shutting down the machining system 10.

While the second machine tool 100B receives the settings of a tool correction value for the first machine tool 100A in the description above, it should be noted that the first machine tool 100A may receive the settings of a tool correction value for the second machine tool 100B. In this case, in response to receiving a request for acquiring a tool correction value for the second machine tool 100B, the first control panel 130A of the first machine tool 100A receives the tool correction value from the second machine tool 100B, and displays a settings screen for receiving a revision to the tool correction value. This allows the operator to revise the tool correction value for the machine tool 100B by operating the first machine tool 100A.

While the tool correction value for the machine tool 100B is transmitted to the machine tool 100A in step S14 in the description above, other information, including the tool correction value, may be transmitted to the machine tool 100A. As one example, information such as frame settings of the TOOL OFFSET screen, which is the tool correction value settings screen displayed on the machine tool 100A, may be transmitted to the machine tool 100B in step S14. In this case, in step S20, the second machine tool 100B displays the TOOL OFFSET screen, using the frame settings received from the first machine tool 100A.

While the tool correction values such as the geometric parameter 81A and the wear parameter 81B are transmitted to the machine tool 100B in step S14 in the description above, the parameters to be transmitted are not limited thereto. As one example, the machining program for the machine tool 100A or the count of parts processed by the machine tool 100A may be transmitted to the machine tool 100B in step S14. In this case, the machine tool 100B merely displays the machining program and the count of processed parts received from the machine tool 100A, and does not receive any revision operation on the tool correction value. This allows the operator to confirm the machining program of the machine tool 100A and the count of processed parts by operating the machine tool 100B.

While the tool correction value is entered on the settings screen 80 in the description above, the tool correction value is not necessarily entered on the settings screen 80. As one example, the tool correction value may be input to file data, such as a CSV file. More specifically, the file data defines tool correction values by machine tool, and the operator can revise the tool correction value on the file data. After revising the file data, the operator causes the machine tool 100B to read the file data. Subsequently, based on the read file data, the machine tool 100B transmits the revised tool correction value to a machine tool the tool correction value for which is to be revised. This sets tool correction values for the machine tools 100 in bulk.

Moreover, the tool correction value is not necessarily entered manually. As one example, an instrument for measuring the geometry of a workpiece may be built in the machine tool, and the machine tool may correct the tool correction value, based on a result of measurement by the instrument. In this case, the machine tool previously holds the geometric data regarding the machined workpiece, compares the geometric data with a result of measurement by the instrument, thereby revising the tool correction value. The revised tool correction value is transmitted to a corresponding machine tool. This automatically sets the tool correction value for the machine tool.

<C. Another Example of Settings Screen 80 Displayed and Controlled by Display Control System>

Figure 4:
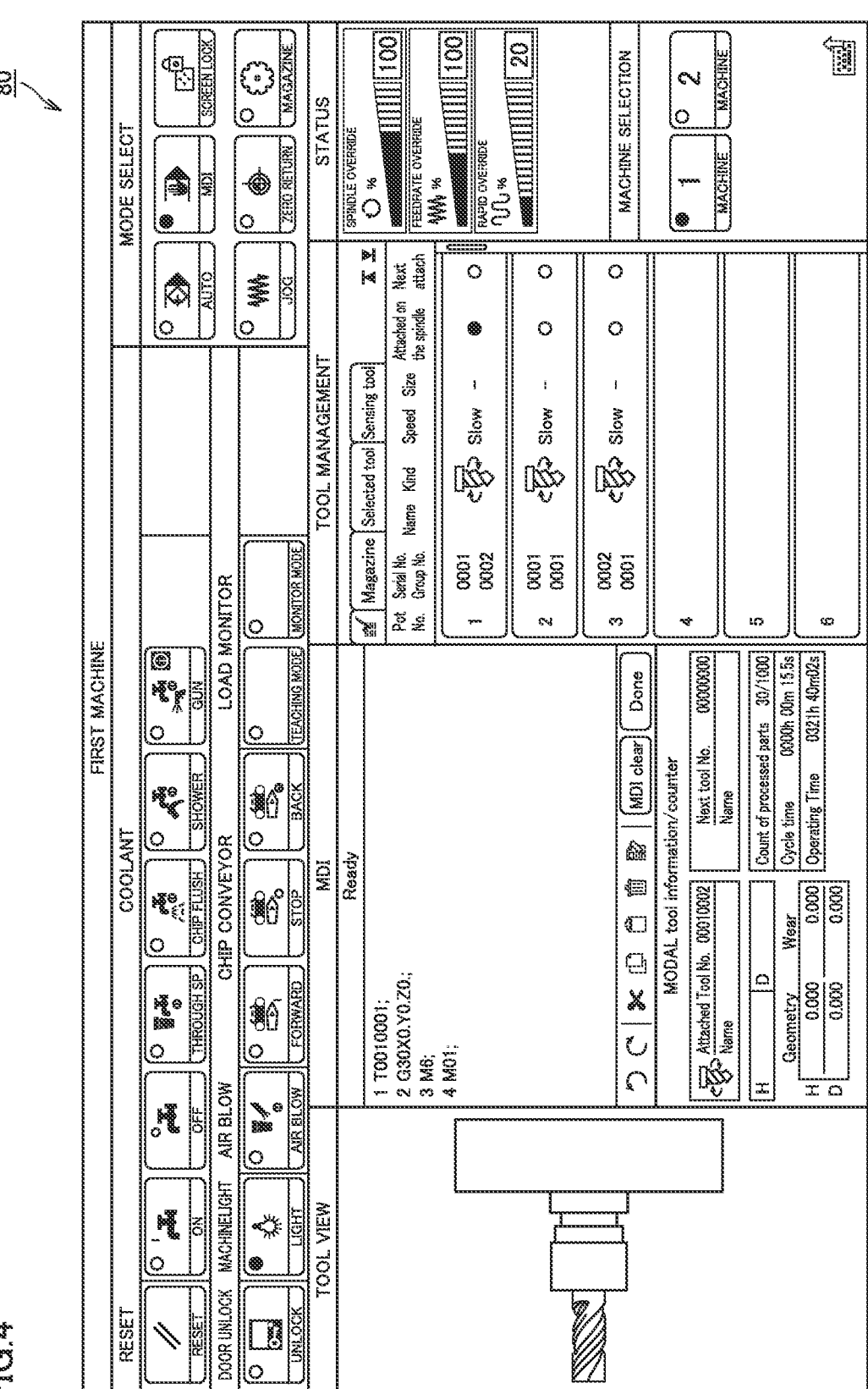
FIG. 4 is a diagram illustrating one example screen controlled by the display control system.

Next, an example screen that is displayed and controlled by the display control system is described, with reference to FIG. 4.

FIG. 4 shows a screen, displaying information regarding the first machine tool 100A that is displayed and controlled by the display control system. In the above description, the display control system is part of configurations of the second machine tool 100B and capable of communications with the first machine tool 100A and the second machine tool 100B. However, the present disclosure is not limited thereto. For example, the display control system may be a tablet or computer that is separate from and independent of the first machine tool 100A and the second machine tool 100B. In this case, the tablet or computer is required to be able to communicate with the first machine tool 100A and the second machine tool 100B. A screen displayed on the display of the tablet or computer is, for example, the screen as shown in FIG. 4. The display control system may also be a computer having a server function. The display control system may also be a desktop computer, a note computer, or a tablet.

The screen of FIG. 4 is now described in detail. The icons on the upper left are buttons that are displayed at all times. A reset button and coolant buttons are disposed on the top left. A door unlock button, a machine light button, an air blow button, and chip conveyor buttons are disposed on the second row from the top. Operation mode selection buttons are disposed on the top right. An automatic mode (AUTO) button, a manual data input (MDI) mode button, and a screen lock button are arranged on the top row, starting from the left to the right. As the automatic mode is selected, a display instruction means of the display control system instructs displaying an automatic mode screen on which program execution, parameters and various data settings, and program editing are permitted. As the MDI mode is selected, the display instruction means of the display control system instructs displaying a MDI mode screen on which MDI operation, and parameters and various data settings are permitted. The MDI operation refers to manual input and execution of a program. A JOG mode button, a zero return button, a magazine mode button, which are manual modes, are disposed on the second row from the top right row. In the JOG mode, each spindle can be jogged (relatively slow feed). While the manual spindle feed button is being pressed, the spindle is moved in a selected direction at a feed speed set by the feed override switch. As the JOG mode is selected, a display and control means of the display control system instructs displaying a screen required for the operations stated above to be performed. In the ZERO RETURN mode, each spindle can be manually returned to the machine origin.

In FIG. 4, the MDI mode is selected, and the display instruction means is instructing displaying the screen regarding the MDI mode, which is displayed at the center of the screen. The TOOL VIEW screen is displayed to the left of the MDI screen. TOOL VIEW displays a still image or video of a tool captured by a camera. A TOOL MANAGEMENT screen is displayed to the right of the MDI screen. In the present embodiment, the TOOL MANAGEMENT screen displays information of a tool attached to the magazine. In TOOL MANAGEMENT, a large number of tool information items are registered for management of the tools.

In FIG. 4, the MDI mode is selected, a program is input in the MDI input screen and executed for exchanging the tool attached to the main spindle. As the program is executed, the tool is exchanged and a new tool is attached to the main spindle. An image of the tool now attached to the main spindle is captured by the camera and displayed in the TOOL VIEW screen. While viewing TOOL VIEW, the operator is allowed to confirm that a desired tool is associated with a tool number specified in the program. In other words, the operator can confirm, during the setup phase, that the tool corresponding to the tool number is a predetermined tool, without having to be present in front of the machine tool.

<D. Another Example of Settings Screen 80 Displayed and Controlled by Display Control System>

Figure 5:
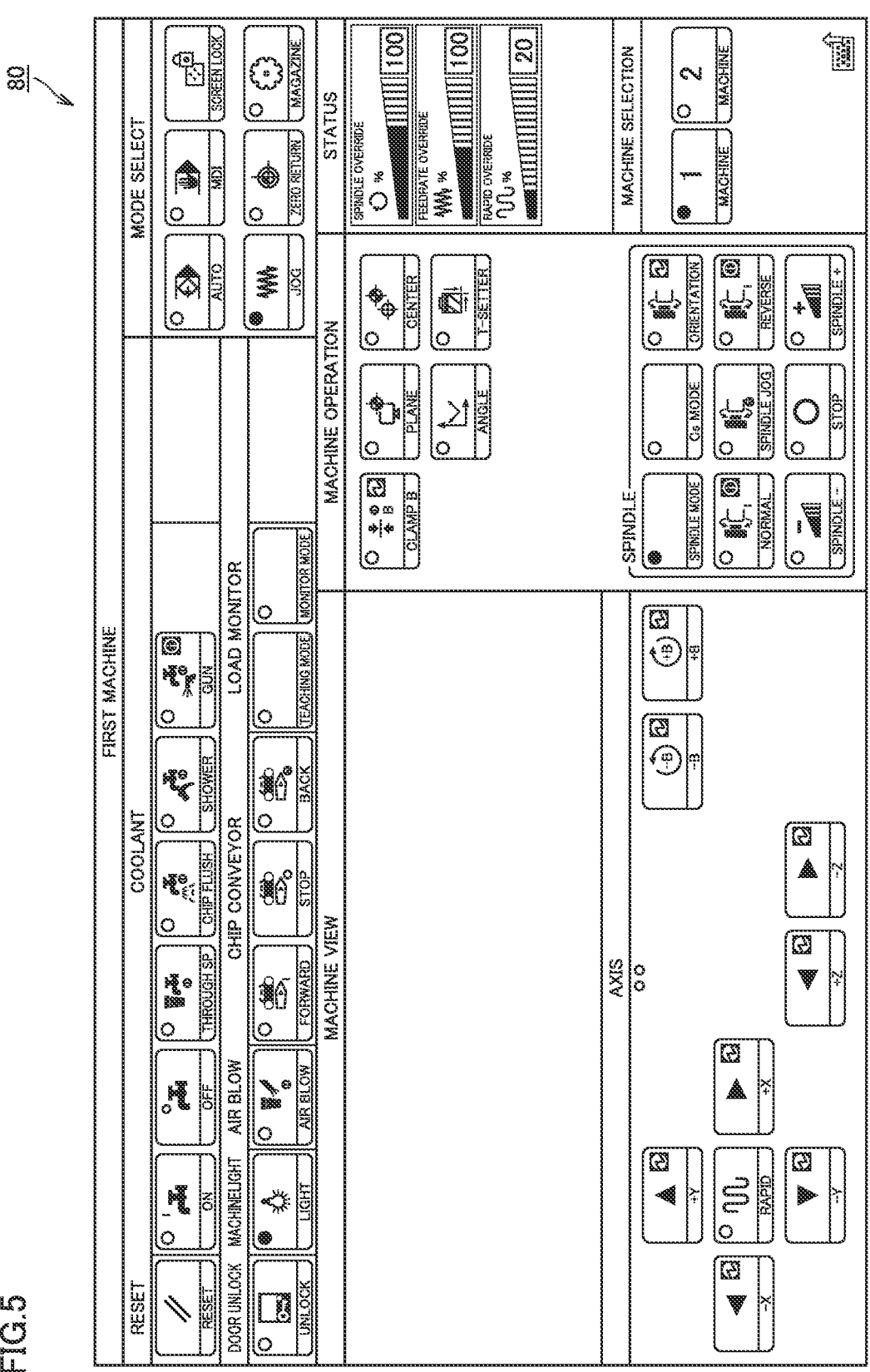
FIG. 5 is a diagram illustrating one example screen controlled by the display control system.

In FIG. 5, the jog mode is selected, and a jog control panel and MACHINE VIEW are displayed on the screen. The operator can confirm, through MACHINE VIEW, a video provided by the camera, while manipulating the jogging. In this case also, the operator can operate the machine tool, without having to be present in front of the machine tool. In addition, if the operator is less experienced, a skilled operator can remotely operate the machine tool and the less experienced operator can learn, in front of the machine tool, about how to operate the machine tool.

Figure 7:
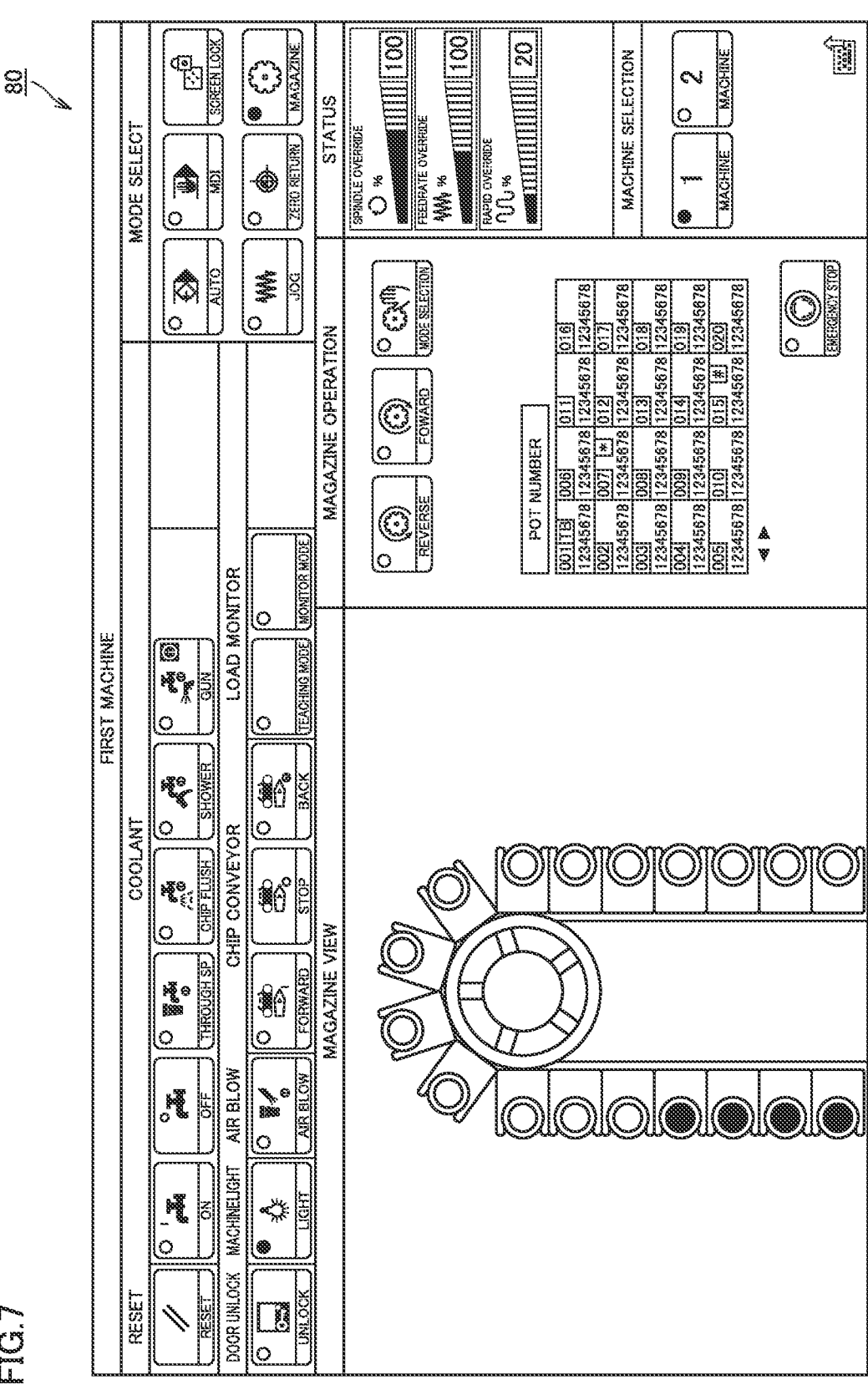
FIG. 7 is a diagram illustrating one example screen controlled by the display control system.

In FIG. 7, the magazine mode is selected, and a magazine control panel and MAGAZINE VIEW are displayed on the screen. The operator can confirm, through MAGAZINE VIEW, the video provided from the camera, while manipulating the magazine control panel. This allows the operator to confirm that a predetermined pot of the magazine is accommodating a predetermined tool.

<E. Another Example of Settings Screen 80 Displayed and Controlled by Display Control System>

Figure 8:
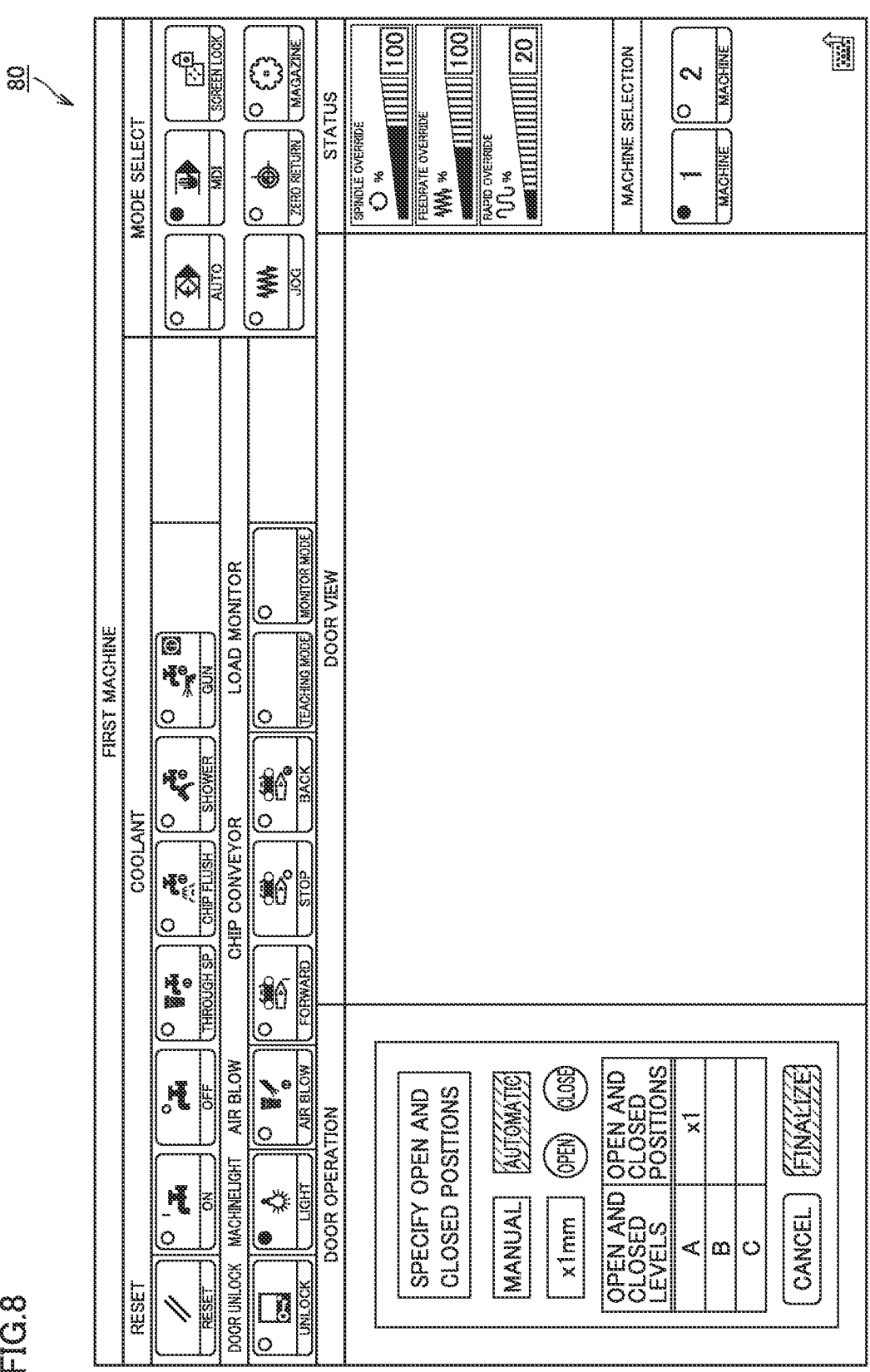
FIG. 8 is a diagram illustrating one example screen controlled by the display control system.

In FIG. 8, a door mode is selected, and a door control panel and DOOR VIEW are displayed on the screen. The operator can confirm, through DOOR VIEW, a video provided by the camera, while manipulating the door.

<F. Another Example of Settings Screen 80 Displayed and Controlled by Display Control System>

As the first machine tool 100A inputs and executes a tool exchange command code (e.g., "M6") in response the operator entering a tool number (e.g., "T1") on the MDI screen shown in FIG. 4, the tool registered with the tool number is mounted to the main spindle 117A of the first machine tool 100A. The first camera 111A captures an image of the tool mounted to the main spindle 117A. The captured image (an image containing the tool) is displayed in the TOOL VIEW screen next to the MDI screen.

Next, as the tool number (e.g., "T9") is entered on the MDI screen, a tool exchange code (e.g., "M6") is entered, and the execution button is depressed, the first machine tool 100A exchanges the tool. Here, suppose that no tool is stored in the magazine with the tool number "T9."

In this case, the tool registered with the tool number "T1" and mounted to the main spindle 117A is detached from the main spindle 117A and accommodated in the magazine. However, since no tool is present having the tool number "T9," no tool is mounted to the main spindle 117A. The first camera 111A also captures an image of such a state, which is then displayed in the TOOL VIEW screen next to the MDI screen. Since no tool is displayed in the TOOL VIEW screen (specifically, only the main spindle is displayed), the operator is allowed to know that no tool is mounted to the main spindle 117A. Note that in order to intentionally mount no tool to the main spindle, the operator may enter a tool number associated with no actual tool in the MDI screen, and enter and execute a NC code for tool exchange.

Thus, according to the display control system of the present embodiment, the operator is allowed to know the circumstances inside the machine tool 100A (that no tool is mounted to the main spindle 117A), which is conventionally unknown to the operator, without actually viewing inside the machine tool 100A.

While the display control system displays an image of the interior of the first machine tool 100A in the description above, the present disclosure yields the same advantageous effects even when the display control system displays an image of the interior of the second machine tool 100B.

<G. Hardware Configuration of Machine Tool 100>

Figure 9:
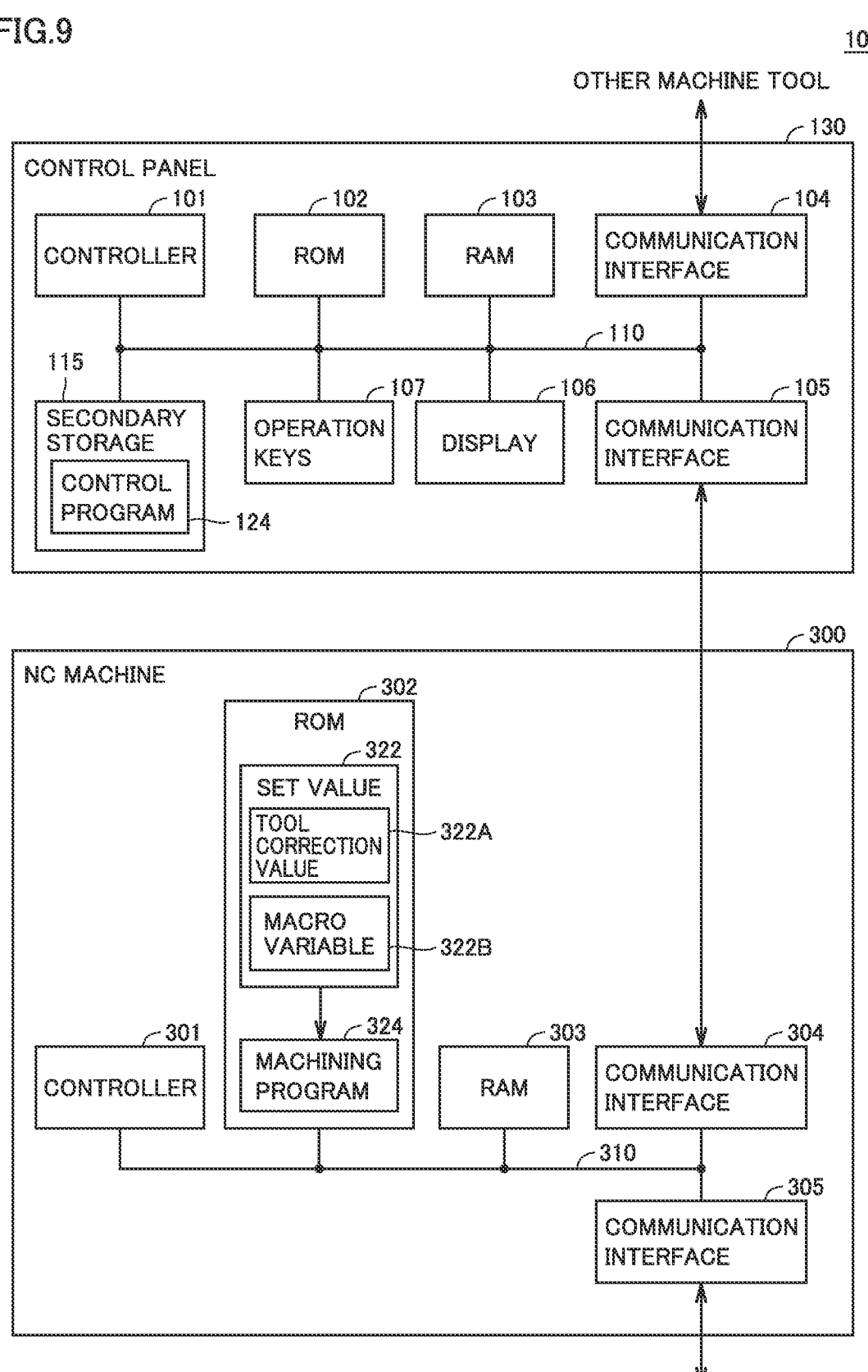
FIG. 9 is a schematic view of one example hardware configuration of the machine tool.

Referring to FIG. 9, a hardware configuration of the machine tool 100 is now described. FIG. 9 is a schematic view of one example hardware configuration of the machine tool 100.

The machine tool 100 includes the control panel 130 and a numerical control machine (NC machine) 300. In the following, a hardware configuration of the control panel 130 and a hardware configuration of the NC machine 300 will be described in the order.

(G1. Hardware Configuration of Control Panel 130)

The control panel 130 includes a controller 101, a read only memory (ROM) 102, a random access memory (RAM) 103, communication interfaces 104 and 105, a display 106, operation keys 107, and a secondary storage 115, which are connected to a bus 110.

The controller 101 includes a display and control device, which is a display control system. The display and control device, which is one example of the display control system, is configured of at least one integrated circuit, for example. The integrated circuit can be configured of, for example, at least one central processing unit (CPU), at least one graphics processing unit (GPU), at least one application specific integrated circuit (ASIC), at least one field programmable gate array (FPGA), or a combination thereof.

The controller 101 executes various programs such as a control program 124 and the operating system, thereby controlling the operations of the control panel 130. The control program 124 includes a program that is partially responsible for the remote setting process described above. In response to receiving an instruction for execution of the control program 124, the controller 101 reads the control program 124 from the secondary storage 115 into the RAM 103. The RAM 103 functions as a working memory, and temporality stores various data which are used to execute the control program 124. In such a configuration, the display and control device instructs a screen to set and display various modes. For the display and control on the screen shown in FIG. 4, the display and control device includes a display instruction means for instructing the screen to set and display manual data input (MDI) modes of multiple machine tools. The display and control device also includes a display instruction means for instructing the screen to display an image captured by the camera or an image obtained by performing image processing on an image captured by the camera.

The communication interfaces 104 and 105 are connected to a local area network (LAN) and antennas. The control panel 130 implements communications with external devices such as a display and control device 200 and external machine tools via the communication interface 104. The control panel 130 also implements communications with the NC machine 300 via the communication interface 105.

The display 106 displays various information regarding machining and information regarding the machine tool and the tool, in accordance with commands from the controller, etc. As one example, the screen as shown in FIG. 4 is displayed on the display 106.

The operation keys 107 are configured of multiple hardware keys, and receive various user operations on the control panel 130. A signal in response to a depressed key is output to the controller 101.

The secondary storage 115 is a storage medium, such as a hard disk, a flash memory, etc. The secondary storage 115 stores the control program 124, etc. The control program 124 is not limited to be stored in the secondary storage 115, and may be stored in a storage area (e.g., a cache memory, etc.) of the controller 101, the ROM 102, the RAM 103, or an external device (e.g., a server).

While hardware configurations such as the controller 101, the ROM 102, the RAM 103, the communication interfaces 104 and 105, and the secondary storage 115 are mounted within the control panel 130 in the description above, it should be noted that these hardware configurations may be configured separately from the control panel 130.

(G2. Hardware Configuration of NC Machine 300)

With continued reference to FIG. 9, a hardware configuration of the NC machine 300 is now described.

The NC machine 300 includes a controller 301, a ROM 302, a RAM 303, and communication interfaces 304 and 305, which are connected to a bus 310.

The controller 301 is configured of at least one integrated circuit, for example. The integrated circuit can be configured of, for example, at least one CPU, at least one ASIC, at least one FPGA, or a combination thereof.

The controller 301 executes various programs such as a machining program 324 and the operating system, thereby controlling the operations of the NC machine 300.

The machining program 324 is a program for implementing the machining of a workpiece. In response to receiving an instruction for execution of the machining program 324, the controller 301 reads the machining program 324 from the ROM 302 to the RAM 303. The RAM 303 functions as a working memory, and temporality stores various data which are used to execute the machining program 324.

The ROM 302 stores the machining program 324, a set value 322 for correcting the amount of movement of the tool when machining the workpiece, etc. The set value 322 is referred to when executing the machining program 324. The set value 322 includes, for example, a tool correction value 322A and a macro variable 322B. The set value 322 and the machining program 324 are not limited to be stored in the ROM 302, and may be stored in a storage area (e.g., a cache memory, etc.) of the controller 301, the RAM 303, or an external device (e.g., a server).

The communication interfaces 304 and 305 are connected to a local area network (LAN) and antennas. The NC machine 300 implements communications with external devices such as the control panel 130 via the communication interface 304. The NC machine 300 also implements communications with various drive units (e.g., a servo driver for driving the tool spindle, etc.) for implementing machining of a workpiece via the communication interface 305.

<H. Hardware Configuration of Display and Control Device 200>

Figure 10:
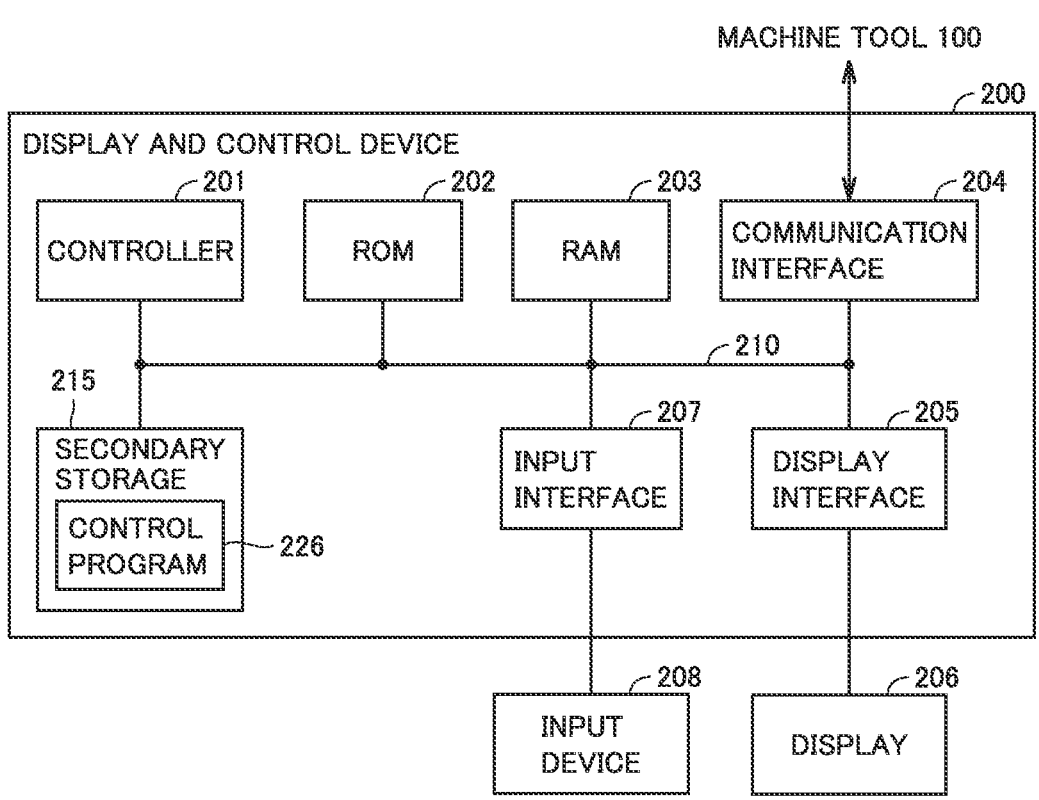
FIG. 10 is a schematic view of a hardware configuration of display and control device.

Next, referring to FIG. 10, a hardware configuration of the display and control device 200 is described. FIG. 10 is a schematic view showing one example of hardware configuration of the display and control device 200.

The display and control device 200 includes a controller 201, a ROM 202, a RAM 203, a communication interface 204, a display interface 205, an input interface 207, and a secondary storage 215, which are connected to a bus 210.

The controller 201 includes at least one integrated circuit, for example. The integrated circuit can be configured of, for example, at least one CPU, at least one GPU, at least one ASIC, at least one FPGA, or a combination thereof.

The controller 201 executes various programs such as a control program 22 and the operating system, thereby controlling the operations of the display and control device 200. The control program 226 is partially responsible for the remote setting process described above. In response to receiving an instruction for execution of the control program 226, the controller 201 reads the control program 226 from the secondary storage 215 to the RAM 203. The RAM 203 functions as a working memory, and temporality stores various data which are used to execute the control program 226.

The communication interface 204 are connected to a local area network (LAN) and antennas. The display and control device 200 implements communications with external devices such as the machine tool 100 via the communication interface 204.

The display interface 205 is connected to the display 206. In accordance with commands from the controller 101, etc., the display interface 205 sends out an image signal for displaying an image to the display 206. The display 206 is, for example, a liquid crystal display, an organic EL display, or any other display device. For example, the settings screen 80 described above is displayed on the display 206. Note that the display 206 may be integrally configured with the display and control device 200, or separately configured from the display and control device 200.

The input interface 207 is connected to an input device 208. The input device 208 is for example, a mouse, a keyboard, a touch panel, or any device that can receive user operations. Note that the input device 208 may be integrally configured with the display and control device 200, or separately configured from the display and control device 200.

The secondary storage 215 is a storage medium, such as a hard disk, a flash memory, etc. The secondary storage 215 stores the control program 226, etc. The control program 226 is not limited to be stored in the secondary storage 215, and may be stored in a storage area (e.g., a cache memory, etc.) of the controller 201, the ROM 202, the RAM 203, or an external device (e.g., a server).

<I. Variations of Display Control System>

While the display control system has been described as a display and control device in the form of hardware, the present disclosure is not limited thereto. The display control system may be software such as a program. Therefore, the display control system may be executed via multiple personal computers.

While the display control system described above is required to be able to communicate with multiple machine tools, the display control system may be capable of communications with at least one machine tool. In other words, the present invention encompasses an embodiment in which one machine tool can be manipulated remotely. If the display control system can communicate with one machine tool, the operator is allowed to confirm the tool through a remote tablet, thereby obviating the need for the operator to operate the machine tool, standing in front of the control panel of the machine tool.

As noted above, the operator is allowed to confirm the state of the machine tool 100 on the operation screen of other machine tool 100 (a screen displayed on the display of the control panel). However, the present disclosure is not limited to such a configuration. The operation screen may not be the screen displayed on a display of the control panel, and may be the screen of a tablet PC (personal computer) or smartphone. The control panel of the machine tool 100 may be detachable from the body of the machine tool 100 and portable.

The presently disclosed embodiment should be considered in all aspects as illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST

10 machining system; 50 transfer device; 51 arm robot; 52 automatic transfer vehicle; 80 settings screen; 81A geometric parameter; 81B wear parameter; 82 tool number; 100A, 100B machine tool; 101, 201, 301 controller; 102, 202, 302 ROM; 103, 203, 303 RAM; 104, 105, 204, 304, 305 communication interface; 106, 206 display; 107 operation key; 110, 210, 310 bus; 111A first camera; 111B second camera; 113A, 113B, 116A, 116B opening and closing door; 115, 215 secondary storage; 117A, 117B main spindle; 118A, 118B machining area; 124, 226 control program; 130 control panel; 130A first control panel; 130B second control panel; 200 display and control device; 205 display interface; 207 input interface; 208 input device; 300 NC machine; 322 set value; 322A tool correction value; 322B macro variable; and 324 machining program.

The invention claimed is:

1. A display control system for displaying and controlling a screen, the display control system comprising:

a first display instruction means that instructs the screen to display a mode of a machine tool;

a second display instruction means that instructs the screen to display a tool image captured by a camera attached to the machine tool; and a control means that displays and controls, in response to receiving input of tool related information regarding a tool in the mode, the tool image corresponding to the tool related information, which is obtained from the camera, wherein the tool related information includes any one of a tool number, a pot number of a magazine accommodating the tool, a station number of a turret to which the tool is attached, and a tool correction value.

2. A display control system for displaying and controlling a screen, the display control system being capable of communications with: a first machine tool, which includes a camera; and a second machine tool, the display control system comprising:

a first display instruction means that instructs the screen to display a first mode of the first machine tool;

a second display instruction means that instructs the screen to display a second mode of the second machine tool;

a third display instruction means that instructs the screen to display a tool image captured by the camera; and a control means that displays and controls, in response to receiving input of tool related information regarding a tool in the first mode, the tool image corresponding to the tool related information, which is obtained from the camera, wherein the tool related information includes any one of a tool number, a pot number of a magazine accommodating the tool, a station number of a turret to which the tool is attached, and a tool correction value.

3. The display control system according to claim 2, wherein when the tool related information, including the tool number, is input, the tool associated with the tool number is attached to a main spindle of the first machine tool and captured by the camera, or when the tool related information, including the pot number of the magazine accommodating the tool, is input, the tool accommodated in a pot with the pot number is captured by the camera, or when the tool related information, including the station number of the turret to which the tool is attached, is input, the tool attached to a station with the station number is captured by the camera.

* * * * *